United States Patent
Stackman et al.

[15] 3,661,504
[45] May 9, 1972

[54] BASIC DYEABLE POLYMER OF POLYETHYLENE TEREPHTHALATE SHAPED ARTICLE CONTAINING 0.5 PERCENT OF A SULFONATED PYRROLE

[72] Inventors: Robert W. Stackman, Morristown, N.J.; Donald E. Sargent, Schenectady, N.Y.

[73] Assignee: Celanese Corporation, New York, N.Y.

[22] Filed: Jan. 28, 1970

[21] Appl. No.: 6,646

Related U.S. Application Data

[62] Division of Ser. No. 605,570, Dec. 29, 1966, Pat. No. 3,507,835.

[52] U.S. Cl. ............................................8/168, 8/178, 8/180, 8/179, 260/75, 260/78, 260/93.7

[51] Int. Cl. .....................................................D06p 5/06
[58] Field of Search ..................8/168, 179; 260/75, 78.5, 78

[56] References Cited

UNITED STATES PATENTS 3,018,272   1/1962   Griffing ....................................260/75
2,952,506   9/1960   Dellis.........................................8/168

*Primary Examiner*—George F. Lesmes
*Assistant Examiner*—B. Bettis
*Attorney*—Thomas J. Morgan, Stephen D. Murphy and Robert J. Blanke

[57] ABSTRACT

A polyethylene terephthalate shaped article containing a sulfonated pyrrole and permeated uniformly throughout by a cationic dye.

5 Claims, No Drawings

BASIC DYEABLE POLYMER OF POLYETHYLENE TEREPHTHALATE SHAPED ARTICLE CONTAINING 0.5 PERCENT OF A SULFONATED PYRROLE

This invention, which is a divisional application of copending application Ser. No. 605,570 filed December 29, 1966, now U.S. Pat. 3,507,835.

The invention relates to compositions and shaped articles made therefrom having improved dyeability properties and methods of producing these products. More particularly, the invention is directed to compositions of synthetic polymers, preferably synthetic linear thermoplastic polymers containing a specific type of sulfonated pyrrole which in turn can provide articles such as films, fibers and the like, having an affinity for basic dyes.

Successful methods have been suggested in the past to improve the dyeability of shaped articles made from synthetic polymers such as fibers, fabrics or films especially utilizing basic dyes to provide brighter colors and also to permit cross dyeing of the articles. These methods utilize the techniques of incorporating sulfonated monomers into synthetic polymers such as acetate, triacetate, acrylic, modacrylic, polyester, nylon, polypropylene and the like to provide copolymers. Typical of this procedure is U.S. Pat. No. 3,018,272 which describes the process of producing basic dyeable polyesters having incorporated therein as monomers, the sulfonated monomers. Although these copolymers provide satisfactory basic dyeable materials, other suitable materials are being sought to provide improvements in dyeability for the synthetic linear thermoplastic polymers.

It has now been discovered that a certain type of sulfonated pyrrole can be incorporated, i.e., in the form of a copolymer or additive into synthetic polymers, to improve the basic dye uptake of these polymers and end products made therefrom. The specific type of sulfonated pyrrole which can be utilized can be represented by the following formula:

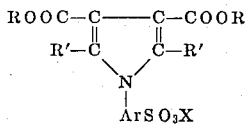

wherein each R, individually, represents hydrogen or an alkyl group containing from one to six carbon atoms; each R', individually, represents hydrogen and an alkyl group containing from one to six carbon atoms; Ar represents an arylene radical and X represents a metal to satisfy the valence of the sulfonate group and preferably represents an alkali metal. It is usually desirable to use at least about 0.5 weight percent of the sulfonated pyrrole based on the total polymer to provide basic dye sites. Polymer compositions having a sulfonated pyrrole content lower than 0.5 weight percent will have only a relatively low affinity for basic dyes. Polymer compositions containing about 10 weight percent of the sulfonated pyrrole compound have a very high affinity for basic dyes. Higher concentrations will not lead to appreciable increases in basic dyeability and in general may unduly affect tenacity in the shaped articles. The sulfonated pyrrole compound concentrations in the range from 2 to 8 weight percent of the total polymer, are preferred. The sulfonated pyrrole compound can be added to the polymerization reaction or to the starting materials such as are used in the ester interchange reaction if this is required. If the presence of these sulfonated pyrrole compounds in the polymer are desired to be in the form of copolymers the addition can occur very early in the polymerization or in the initial starting materials. If it is desired to have the sulfonated pyrrole compounds in the polymer as merely additives then the materials should be added at the later stages of polymerization.

The sulfonated pyrrole compound can be prepared according to the procedure described in Journal Fur Praktische Chemie 17, 213 (1962). This procedure involves the typical reaction such as equimolar amounts of the sodium salt of sulfanilic acid and diethyl diacetyl succinate in acetic acid. Under these conditions, 1-(p-sodium sulfophenyl)-2,5-dimethyl-3,4-dicarbo-ethoxy pyrrole is produced.

In the preparation of the sulfonated pyrrole compounds, typical starting materials include, among others: diethyldiacetyl succinate; dipropyl dipropionyl succinate; di)n-butyl) di(n-butyryl) succinate; di(n-pentyl) diisovaleryl succinate; di(n-hexyl) di(n-caproyl) succinate; and the like. Typical alkali salts of sulfanilic acid include, among others: sodium 4-aminophenyl sulfonate; potassium 4-aminophenyl sulfonate; lithium 4-aminophenyl sulfonate; sodium 4-aminonaphthyl 1-sulfonate; potassium 3-aminonaphthyl 1-sulfonate; lithium 8-aminonaphthyl 1-sulfonate; alkyl substituted sulfanilic acid alkali salts; alkyl substituted aminonaphthyl sulfonic acid alkali salts; halogen substituted sulfanilic acid alkali salts and the like. The metals which can be used to satisfy the valence of the sulfonate group can include the alkali metals such as sodium, potassium, lithium and the like, alkali earth metals such as calcium, strontium, barium and the like or metals such as magnesium, cobalt, manganese and the like. The preferred metals, however, include the alkali metals.

The new compositions of the present invention, i.e., containing sulfonated pyrrole compounds and polymerized synthetic linear thermoplastic polymer, are useful in the production of shaped articles by extrusion, molding, casting or the like. These shaped articles in turn may be formed in fibers (filaments and staple), fabrics, ornaments, films and the like.

The term "linear thermoplastic polymer" as used herein includes polymeric polymethylene terephthalates, especially preferred is polyethylene terephthalate. Other polymers which can be included herein utilized herein are polyalkylene terephthalate containing modifiers such as dibasic acids including among others; isophthalic acid, sebacic acid, adipic acid and the like. Cyclic glycols can also be substituted for the alkylene glycols in the linear terephthalate polymers. Other polymers included herein are polyamides such as polyhexamethylene adipamide, polyhexamethylene sebacamide, polytetramethylene sebacamide, polytetramethylene adipamide and the like. Other polyamides include those prepared from di(4-amino-cyclohexyl) ethane or 1,6-(4-aminocyclohexyl)hexane as the diamine components. Additional polymers include polypropylene, polybutenes and the like. As is known, the intrinsic viscosities of the above-described polymers should be in excess of 0.2, preferably in the range from 0.4 to 1.0 when used for producing textile and industrial products. The measurement of intrinsic viscosity is conducted by utilization of a one-weight percent polymer solution in a mixture of 58.8 parts of phenol and 41.2 parts of trichlorophenol.

Various other materials may be present in the present new compositions. For example, such ester exchange catalysts as salts of calcium, magnesium, manganese and the like and such polymerization catalysts as antimony oxide, antimonic acid or the like, may be used. In addition, pigments, delusterants, or other additives such as titanium dioxide or barium carbonate.

The yarns or filaments produced in accordance with the present invention are suitable for the usual textile applications. They may be employed in the knitting or weaving of fabrics of all types as well as in the production of nonwoven, felt-like products produced by known methods. Their physical properties closely parallel those of their related non-modified polymer fibers. However, they have particular sensitivity toward basic dyes. By a "basic dye" is meant a colored cationic organic substance such as those containing sulfonium, oxonium or quaternary ammonium functional groups. Among the basic types which may be applied to the filaments formed in accordance with the present invention may be mentioned Victoria Green WB (C.I. 657); Thodiamine B (C.I. 749); Brilliant Green B (C.I. 662); Victoria Pure Blue BO(Pr 198); Sevron Blue B; and the like. The dyes are preferably applied from an aqueous solution at a temperature between 80° and 125° C.

Filaments and films, i.e., shaped structures which have at least one dimension relatively vary small and at least one dimension relatively large, are the preferred structures of the present invention. Such structures of the polymer mixtures of this invention are permeated uniformly throughout by basic dyes applied from hot aqueous solution. The penetration of dyes is an important characteristic since poor resistance of fading and loss of color through rubbing or abrasion is a known characteristic of structures which retain dye only at their surfaces.

The following examples will serve to illustrate the invention:

EXAMPLE 1

In a reaction flask, 19.5 grams (0.1 mol) of the sodium salt of sulfanilic acid and 25.8 grams (0.1 mol) diethyl diacetyl succinate are heated in 800 milliliters of acetic acid for 2 hours at 80° C. The reaction product (1-(p-sodium sulfophenyl)-2,5-dimethyl-3,4-dicarboethoxy pyrrole) is cooled and ether added thereto. The reaction product is precipitated and recovered by filtration. The product is recrystallized in a small amount of acetone to obtain a white salt having a melting point of 310°–311° C. The amount of product obtained was 35 grams representing a yield of 84 percent.

EXAMPLE 2

To a 500 ml. three-necked flask equipped with stirrer, nitrogen inlet and distillation head were added 3.89 g. of 1-(p-sodium sulfophenyl)-2,5-dimethyl-3,4-dicarboethoxy pyrrole in 20 ml of ethylene glycol, 0.07 g. antimonic acid and 100 g. bis(hydroxyethyl) terephthalate. The flask was flushed three times with nitrogen, then heated to 235° C., at which temperature all the material had melted to form a clear solution. The temperature was increased over a period of 1 hour to 270° C. The pressure was then slowly lowered by means of a vacuum pump to 0.25 mm Hg while the temperature was increased to 290° C. The polymerizing mixture was stirred at 290° C. and 0.25 mm Hg pressure for 90 minutes. At the end of this period, the vacuum was released and the polymer allowed to cool. The recovered polymer had a crystalline melting point of 248°–251° C. and had an inherent viscosity of 0.47 determined in a mixture of 58.8 parts phenol and 41.2 parts trichlorophenol. The polymer was spun at 285° C. from a melt index apparatus and oriented by stretching over a heated surface. A sample of the oriented fiber was dyed in a Sevron Blue B basic dye bath for 1 hour at 95° C. The fibers dyed to a deep shade of blue having good washfastness properties.

In a similar manner as above, polyhexamethylene adipamide can be substituted for polyethylene terephthalate.

It is understood that the foregoing description is merely illustrative of preferred embodiments of the invention of which many variations may be made by those skilled in the art within the scope of the following claims without departing from the spirit thereof.

WHAT IS CLAIMED IS:

1. A polyethylene terephthalate shaped article containing at least 0.5 weight percent of a sulfonate having the formula:

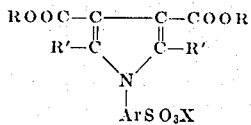

wherein R, each individually, represents hydrogen and alkyl group containing from one to six carbon atoms, R' each individually, represents hydrogen and an alkyl group containing from one to six carbon atoms, Ar represents a phenylene or a naphthalene radical and X represents a metal to satisfy the available valence selected from the group consisting of an alkali metal, an alkali earth metal, magnesium, cobalt and manganese, said shaped article permeated uniformly throughout by a cationic dye, the said dye being bound in the shaped article by the available groups in the shaped article.

2. The shaped article of claim 1 wherein X represents an alkali metal.

3. The shaped article of claim 2 wherein the sulfonate is present in amounts ranging from 2 to 8 weight percent.

4. The shaped article of claim 2 wherein the sulfonate present is 1-(p-sodium sulfophenyl)-2,5-dimethyl-3,4-dicarboethoxy pyrrole.

5. A polyethylene terephthalate fiber having an intrinsic viscosity of at least 0.4 measured in a mixture of 58.8 parts of phenol and 41.2 parts of trichlorophenol wherein said fiber contains 1-(p-sodium sulfophenyl)-2,5-dimethyl-3,4-dicarboethoxy pyrrole in amounts ranging from about 2 weight percentage to about 8 weight percentage based on the total fiber, said fiber permeated uniformly throughout by a cationic dye, the said dye being bound in the fiber by the available groups in the fiber.

* * * * *